No. 689,479.  
H. O. FOERSTERLING.  
PLATE FEEDING MECHANISM FOR CAMERAS.  
(Application filed Apr. 12, 1901.)  
Patented Dec. 24, 1901.

(No Model.)

WITNESSES:
Ella L. Giles

INVENTOR
Hermann Otto Foersterling

BY
Richard
ATTORNEYS

THE NORRIS PETERS CO., PHOTO-LITHO., WASHINGTON, D. C.

UNITED STATES PATENT OFFICE.

HERMANN OTTO FOERSTERLING, OF SCHLACHTENSEE, GERMANY.

PLATE-FEEDING MECHANISM FOR CAMERAS.

SPECIFICATION forming part of Letters Patent No. 689,479, dated December 24, 1901.

Original application filed February 20, 1900, Serial No. 5,926. Divided and this application filed April 12, 1901. Serial No. 55,492. (No model.)

*To all whom it may concern:*

Be it known that I, HERMANN OTTO FOERSTERLING, engineer, a subject of the Emperor of Germany, and a resident of Victoria Villa, Schlachtensee, near Berlin, in the Empire of Germany, have invented a certain new and useful Improvement in Plate-Feeding Mechanism for Cameras, of which the following is a full, clear, and exact description.

This application is divided from a prior application of mine, Serial No. 5,926, filed February 20, 1900.

The subject-matter of the present invention relates to an improvement in apparatus for changing and depositing or delivering photographic plates in photographic cameras, in which the plates, placed horizontally one above the other in layers in a magazine, are pushed by a slide from the magazine into the exposing-chamber and on drawing back the slide drop into a collecting-chamber.

The invention consists in a combination of parts by which the exposed plate is moved in a vertical position into the developing-chamber, located below the exposing-chamber. This combination is made in such a manner that after moving forward the conveying-slide coöperating with the plates the plate can be vertically erected by means of a lever rotating on a horizontal axle, so that such plate passes into the position for exposure, a slot being formed by the axle of the rotary lever and the frame of the exposing-opening, which slot is covered by the slide that has been moved forward and is uncovered on slightly drawing back the slide, so that the plate drops down in a vertical position.

Figure 1:
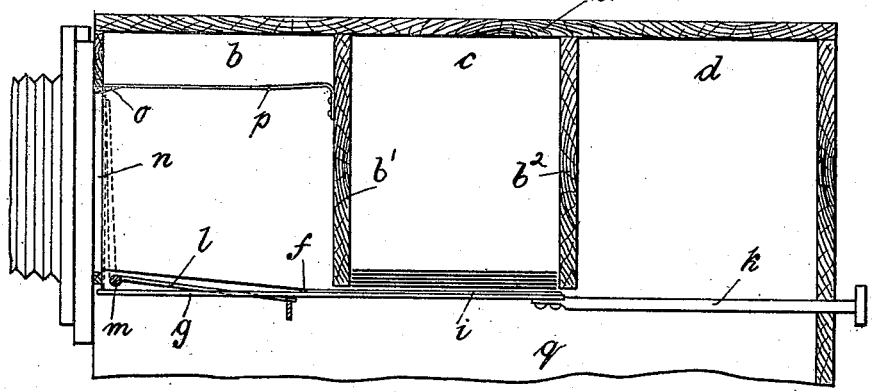
Figure 3:
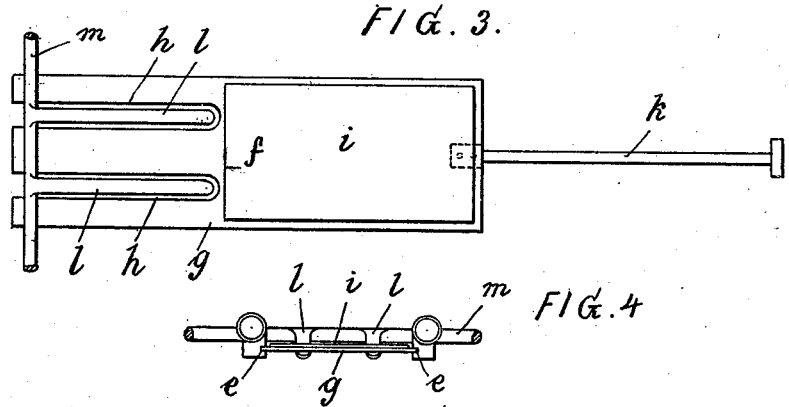
Figure 4:
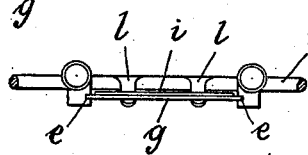
Figure 2:
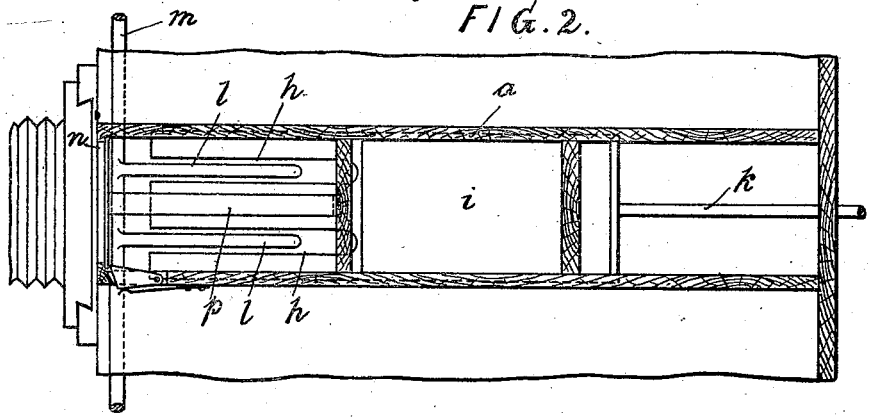

Referring to the accompanying drawings, Figure 1 is a vertical longitudinal section through the camera containing the exposing-chamber and the plate-magazine. Fig. 2 is a horizontal longitudinal section of this camera. Fig. 3 is a plan of the slide for feeding the plates and of the lever for lifting the latter out of the horizontal into the vertical position. Fig. 4 is a view from the left side of the parts shown in Fig. 3.

The box $a$ is divided by partitions $b'$ $b^2$ into three chambers $b$ $c$ $d$. The chamber $b$ is the chamber in which the exposure takes place, while in the chamber $c$ the unexposed plates are disposed in layers one above the other. The chamber $d$ serves for receiving a part of the slide $g$ when retracted. Below the chambers is slidably arranged in two grooves $e$, Fig. 4, the slide adapted to convey the plates from the chamber $c$ to the chamber $b$. This slide consists of the front part $g$, provided with longitudinal recesses $h$ and a stop at $f$, the central part $i$, and the sliding rod $k$. In the position shown in Fig. 1 the unexposed plates in the magazine of the chamber $c$ rest or bear on the part $i$. If the slide is drawn back by means of the rod $k$, the part $g$ passes below the plates located in $c$ and the stop $f$ behind the edge of the bottom plate. On moving the slide forward this plate is moved by the stop $f$ into the chamber $b$ onto fork-shaped arms $l$, oscillating on an axle $m$. By turning the arms upward by means of a suitable handle, which is not shown in the drawings and may be secured to the axle $m$ on the exterior of the box $a$, the arms $l$ can be oscillated upward and the plate bearing thereon brought in front of the opening $n$, located opposite to the objective or object glass. In order to secure the said plate in this position during the exposure, a spring $p$, with front projection $o$, is provided in the compartment $b$. Adjacent to this projection $o$ is arrested the upper edge or rim of the plate, whereas the lower edge between the axle $m$ and lower frame of the opening $n$ bears on the front end of the slide part $g$. If the exposure of the plate is completed, the slide is moved for the purpose of removing the exposed plate so far back that the space between the axle $m$ and lower frame part of the opening $o$ is free. The plate then drops through this space or chamber under the pressure of the compressed spring $p$ into the chamber $q$ for the developing-baths, where it is made ready.

Having now particularly described and ascertained the nature of the said invention, I declare that what I claim, and wish to secure by Letters Patent, is—

In a photographic camera, the combination with the exposing-chamber, of a plate-magazine located in rear of the exposing-chamber, a conveying-slide located horizontally below the plate-magazine, a horizontal axle and an arm carried thereby forming with the frame of the exposing-opening a slot in which a plate moved forward by the slide and erected by the arm, can drop vertically out of the exposing-chamber on drawing back the slide, substantially as described.

In witness whereof I have hereunto set my hand in presence of two witnesses.

HERMANN OTTO FOERSTERLING.

Witnesses:
F. MERKEL,
ROLLAND.